United States Patent
Kumar et al.

(10) Patent No.: US 6,864,931 B1
(45) Date of Patent: *Mar. 8, 2005

(54) ELECTRICALLY CONTROLLABLE LIQUID CRYSTAL MICROSTRUCTURES

(75) Inventors: Satyendra Kumar, Kent, OH (US); Jae-Hoon Kim, Kanngwon-Do (KR)

(73) Assignee: Kent State University, Kent, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/913,253

(22) PCT Filed: Feb. 16, 2000

(86) PCT No.: PCT/US00/03866
§ 371 (c)(1),
(2), (4) Date: Aug. 10, 2001

(87) PCT Pub. No.: WO00/49452
PCT Pub. Date: Aug. 24, 2000

Related U.S. Application Data

(60) Provisional application No. 60/120,505, filed on Feb. 17, 1999.

(51) Int. Cl.[7] ............................ G02F 1/1333; G02F 1/13
(52) U.S. Cl. ........................... 349/88; 349/188; 349/201
(58) Field of Search .............................. 349/86, 88, 93, 349/187–188, 95, 200–202, 123, 122, 89

(56) References Cited

U.S. PATENT DOCUMENTS

| | | | |
|---|---|---|---|
| 4,673,255 A | 6/1987 | West et al. | 350/347 |
| 5,096,282 A | 3/1992 | Margerum et al. | 359/3 |
| 5,386,308 A | 1/1995 | Michel et al. | 349/11 |
| 5,396,350 A | 3/1995 | Beeson et al. | 359/40 |
| 5,473,450 A | 12/1995 | Yamada et al. | 359/51 |
| 5,583,672 A | 12/1996 | Kim | 349/92 |
| 5,668,651 A | 9/1997 | Yamada et al. | 349/117 |
| 5,764,310 A | 6/1998 | Yamagishi | 348/744 |
| 5,781,257 A | 7/1998 | Gal et al. | 349/57 |
| 5,886,760 A | 3/1999 | Ueda et al. | 349/95 |
| 5,949,508 A | 9/1999 | Kumar et al. | 349/122 |
| 5,990,992 A | 11/1999 | Hamanaka et al. | 349/95 |
| 5,997,756 A | 12/1999 | Okazaki et al. | 216/26 |
| 6,147,737 A | 11/2000 | Yachi | 349/122 |
| 6,400,430 B2 | 6/2002 | Nakao et al. | 349/89 |
| 6,486,932 B1 | 11/2002 | Nakao et al. | 349/89 |

FOREIGN PATENT DOCUMENTS

| WO | WO 99/30208 | 6/1999 |
|---|---|---|

OTHER PUBLICATIONS

Kim et al *A method for the formation of polymer walls in liquid crystal/polymer mixtures*, Appl. Phys. Lett. V72, No. 18, pp. 2253–2255, May, 1998.

He et al., "Novel Liquid Crystal Grating with a Relief Structure ...," Jpn. J. Appl. Phys., vol 37, pp. 4066–4069, (1998).

*Primary Examiner*—Dung T. Nguyen
(74) *Attorney, Agent, or Firm*—Fay, Sharpe, Fagan, Minnich & McKee, LLP

(57) ABSTRACT

This invention relates to methods of building rigid or flexible arrays of electro-optic devices. A phase separated composite structure technique yields adjacent regions of polymer and liquid crystal (LC) of specific architecture instead of a random dispersion of LC droplets. The above devices can be prepared by producing volutes of LC structure (56) next to a polymer area (58) using anisotropic phase separation of LC from a photopolymer. Initial by UV exposure. The shape, size and placement of these regions inside a cell becomes easily controllable with using optical mask or laser beam. The boundaries of LC volume can be controlled by controlling the chemical composition of the polymer and using an alignment layer (28).

30 Claims, 17 Drawing Sheets

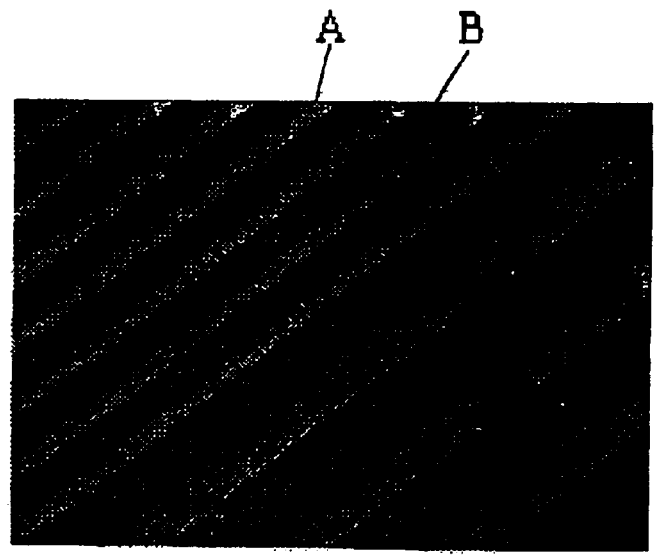
FIG — 3
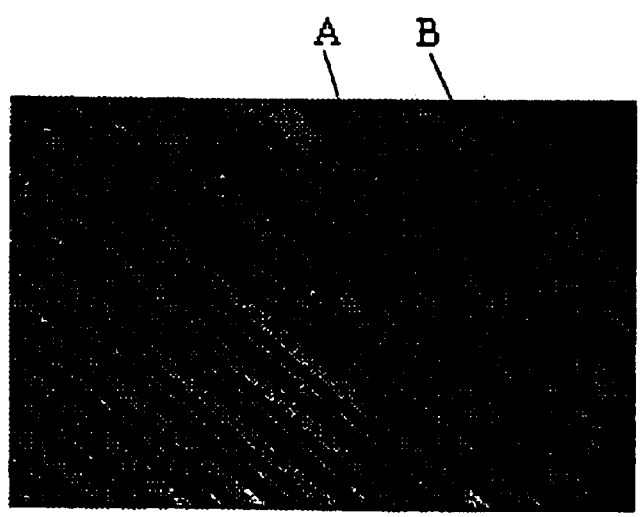
FIG — 4

ELECTRICALLY CONTROLLABLE LIQUID CRYSTAL MICROSTRUCTURES

This application is a 371 of PCT/US00/03866 filed Feb. 16, 2000, which claims benefit of 60/120,505 filed Feb. 17, 1999.

The United States Government has a paid-up license in this invention and may have the right in limited circumstances to require the patent owner to license others on reasonable terms as provided for by the terms of Grant DMR 89-20147, awarded by the National Science Foundation.

TECHNICAL FIELD

The present invention herein resides in the art of light modulating, shuttering, beam steering, and focusing devices that employ composite organic materials. In particular, this invention relates to a device in which a composite layer of optical material is formed by phase separation of a solution of prepolymer and low molecular weight organic fluid or a second crosslinkable prepolymer. It teaches specific techniques for fabricating required internal architecture of the composite material which, depending on the desired application, may be parallel films of liquid crystals and polymer or regions of liquid crystal of specific shape surrounded by polymer regions. Liquid crystal regions may be shaped and patterned to function as one-dimensional and two dimensional gratings, electrically addressable microlenses, or bounded and defined microstructures.

BACKGROUND ART

Electro-optical devices are indispensable in this age of high-speed optical, and digital communications. These applications require high bandwidth, low skew and cross talk, and high interconnect density. There is an on-going effort to develop micro- and submicrometer size optical components. A majority of such components are built using existing technologies. But these components are not switchable which is essential for reprogrammable interconnects, angle multiplexers, data storage, and dynamically variable focal length devices.

With the advancements in computing and communications technology, there is a growing and critical need for real-time reconfigurable optical elements such as fast optical switches, diffractive gratings, and microlens arrays for use in high-density optical interconnections, beam steering, and modulating devices. The ability to electrically switch/control the action of these devices is a key requirement. Until now, various technologies have been used in attempts to build such devices based on liquid crystals, polymers, and solid state materials. For example, passive elements have been built using surface relief structures. Methods to build active microlens arrays include (i) a combination of passive solid state planar optical components and a liquid crystal (LC) modulator, and (ii) gradient refractive index profile (GRI) of liquid crystal switched with an axially symmetric electric field generated with specially designed electrode patterns. Switchable optical gratings have been made using polymer dispersion of liquid crystal, known as the PDLC technology. Their performance is marred by factors such as high light scattering due to their internal structure and the need for high operating voltages. Furthermore, the size of droplets in PDLCs, which is in the several micron range with high polydispersity, puts a lower limit on the size of these microstructures. A second approach uses alternatingly aligned linear domains or lines of LC. These devices are built with cumbersome processes. Furthermore, this method cannot be used for two-dimensional arrays which are necessary for high interconnect density.

In order to build an optical modulator of a well defined shape of liquid crystal volume, specific methods have been proposed. An electrooptical medium may be obtained by er, confining liquid crystal within polymer walls using UV exposure with a photo mask. However, in this method, the phase separation is promoted by UV exposure only in the UV exposed region. Since the liquid crystal rich structure is formed only in non-UV exposed region, the structure is non-uniform. An electro-optical device can also be made using liquid crystal confined by polymer walls using UV exposure while applying an electric field (Appl. Phys. Lett. V72, p2253 (1998)). However, in this case, polymer walls are produced by applying high (10 V $\mu$m) electric field to separate the LC from the polymer, with the polymer walls then shaped by polymerization initiated by UV exposure. The LC regions in the direction perpendicular to the cell cannot be controlled limiting its utility. Alternatively, a display medium may be obtained by confining liquid crystal inside microdroplets. In this method, the liquid crystal is confined in microdroplets, and a relatively high voltage is used to change the orientation of the liquid crystal. However, it is not possible to control the shape of the microdroplets and LC director configuration inside them.

Clearly, there is need for lowest, high-speed, and high-performance electro-optical devices which can be built with relative ease and operated at low voltages. A promising technology is disclosed in U.S. Pat. No. 5,949,508, which is in incorporated herein by reference. This patent teaches forming phase separated composite films (PSCOF) that result in parallel layers of pure LC and polymer and with a desired orientation of the LC optic axis. An electric field may be used to control the optical axis to control their performance. PSCOF structures have highly desirable properties not previously observed in devices prepared by other methods. Such devices can be prepared with rigid as well as flexible substrates with excellent tolerance to mechanical deformations.

Based upon the foregoing, it is evident that there is a need in the art for a liquid crystal microstructure precisely defined and bounded by a polymeric material. There is also a need for such a microstructure to be electrically controllable and contained within a stable package for use in high-density electro-optical devices.

DISCLOSURE OF INVENTION

In light of the foregoing, it is a first aspect of the present invention to provide an electrically controllable liquid crystal microstructure and a method for manufacturing the same.

It is another aspect of the present invention to provide a liquid crystal microstructure in a one-, two-, or three-dimensional configuration. Such a microstructure is controlled by application and/or removal of an electric field in any various form. Such a microstructure may be used with many types of liquid crystal material, may be configured into any thickness or bounded shape, and contained between two rigid or flexible substrates. The size of such microstructures can be as small as 3,000 angstroms and possibly smaller.

It is a further aspect of the present invention, as set forth above, to provide electrically controllable liquid crystal microstructures that are formed using a phase-separated composite organic film method, wherein one- and two-dimensional switchable gratings and three-dimensional microlenses using liquid crystal materials, such as nematic and ferroelectric LCs, can be made. Such devices, which have no sub-structures internal to the LC regions to cause light scattering, offer high efficiency and light throughput at speeds of 100 kHz and possibly even faster. Moreover, the phase separated composite organic film technology permits formation of mechanically stable microstructures using thin, flexible plastic substrates if desired.

It is yet another aspect of the present invention, as set forth above, to provide a one-dimensional grating wherein the dimensional structures of the grating are precisely controlled and wherein the gratings can be formed in parallel lines adjacent to one another. Such gratings can also be provided with progressively wider or progressively thinner amounts of liquid crystal material as dictated by the end use. Such a structure may also be used to form a cylindrically-shaped lens. Such gratings are formed by using a photomask and application of ultraviolet light, or a collimated beam of light or laser light. Other methods of phase separation, such as thermal induced or solvent induced phase separations, are also capable of producing the above and other microstructure.

It is yet another aspect of the present invention, as set forth above, to form a two-dimensional grating formed in much the same manner as the one-dimensional grating, but wherein a two-dimensional mask is used to control the placement and bounding of the liquid crystal material.

It is still another object of the present invention, as set forth above, to provide a three-dimensional microstructure or microlens by utilization of a photomask with circular apertures a few micrometers in diameter or sized as needed by an end use. By controlling the phase separation process, a curved interface may be obtained between polymer material and liquid crystal material within the microstructure. This allows for concentration/diffusion of light as it passes through the microlens or as light is reflected by the microlens.

It is still a further object of the present invention, as set forth above, to provide such microstructures between glass or plastic substrates wherein one of the substrates is provided with an alignment layer compatible with the liquid crystal or low weight molecular organic material.

It is still yet another object of the present invention to form polymer bounded microstructures adjacent the alignment layer which exhibit bistable characteristics. Although confined by substantially pure polymer regions, the microstructures have no defined pattern on the alignment layer. Moreover, if both substrates are provided with an alignment layer, then polymer bounded microstructures may bond to each substrate as dictated by the phase separation method used.

It is an additional object of the present invention, as set forth above, to provide electrodes on each of the substrates, wherein each electrode is connected to an electrical power source which allows for switching of the low molecular weight/liquid crystal material. Such electrical control of the material allows for adjustment of the focal length of the microstructure, thereby allowing control of a light beam with such a device.

The foregoing and other objects of the present invention, which shall become apparent as the detailed description proceeds, are achieved by a light modulating cell, comprising a pair of opposed substrates, solution of a prepolymer and low molecular weight (LMW) organic material wherein the solution is phase separated to form a layer of polymeric material predominantly adjacent to one of the substrates and a defined microstructure of LMW organic material primarily adjacent to the other of the substrates.

Other aspects of the present invention are attained by a cell comprising a pair of opposed substrates and at least one liquid crystal microstructure bounded by a polymer material, wherein the liquid crystal microstructure is adjacent one of the substrates and wherein the polymer material is primarily adjacent the other of the substrates and is contacting to both of the substrates.

Still another aspect of the present invention is attained by a method for fabricating a low molecular weight microstructure, comprising the steps of preparing a solution of prepolymer and low molecular weight (LMW) organic material, disposing the solution between a pair of substrates, and inducing phase separation of the solution, wherein at least one LMW microstructure is formed on one of the substrates.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 3 is a microphotograph of a phase separated composite organic film one-dimensional grating of varying pitch using nematic liquid crystal material in a sample of 50 $\mu$m thickness;

FIG. 4 is a microphotograph of a phase separated composite organic film grating of varying pitch using ferroelectric liquid crystal material in a sample of 3 $\mu$m thickness;

FIG. 9 is a series of photographs showing a diffracted laser beam by a two-dimensional ferroelectric grating wherein

FIG. 13 is a series of microphotographs showing an intensity profile of a He-Ne laser beam observed by a CCD camera after passing through one of the microlenses shown in FIG. 12.

FIG. 15 is a series of microphotographs showing an intensity profile of a He-Ne laser beam observed by a CCD camera placed at 5 cm from one of the microlenses shown in FIG. 12 after passing through it, wherein the beam is focused at a distance of 5 cm, as a function of applied voltage wherein

PREFERRED EMBODIMENT FOR CARRYING OUT THE INVENTION

The present invention provides a way of building new electro-optic devices consisting of phase separated composite organic structures (PSCOS) for use as light modulating, beam steering, and focusing elements. The position, shape, and size as well as the uniformity of liquid crystal material and polymer rich regions is easily controlled by the methods disclosed herein. One can use nematic, cholesteric, smectic (e.g., chiral Sm A, ferroelectric, ferroelectric, and antiferroelectric), or any other liquid crystal (LC) to construct devices with the present invention.

The devices of the present invention are fabricated by means of anisotropic polymerization induced phase separation (APIPS) of LC from its solution in a pre-polymer. The solution is placed between two substrates (glass or plastic) on which electrodes and alignment layer(s) were previously deposited depending upon the desired characteristics of the device. A photomask with desired pattern is placed between the UV source and the cell. The anisotropic phase separation is started by ultraviolet (UV) exposure of selected areas and helped by surface wetting properties of the substrates or of an alignment layer on the substrate(s). The phase separation occurs not only in the direction parallel to substrate but also in the perpendicular direction, ie., 0 to 3-dimensions. The desired LC/polymer configuration can be formed in exposed areas, unexposed areas or in both depending on the sample thickness, concentration of LC, size of light exposed area, and UV intensity. The light exposed and unexposed areas can be controlled by use of a photomask. Depending on the desired architecture, a double UV exposure method may be used Alternative methods of phase separation may also be used. By applying heat to predetermined areas of the substrates, thermally induced phase separation occurs. Solvent induced phase separation may also be applicable to formation of some of the microstructures.

The alignment of LC at the substrate surface can be controlled by the alignment layers. At the polymer walls, the alignment of the LC can be determined by controlling the chemical structure and concentrations of the pre-polymer. Additionally, the anchoring conditions at the boundaries can also be imprinted by using an electric, magnetic field, or mechanical shear during phase separation.

Figure 1A:
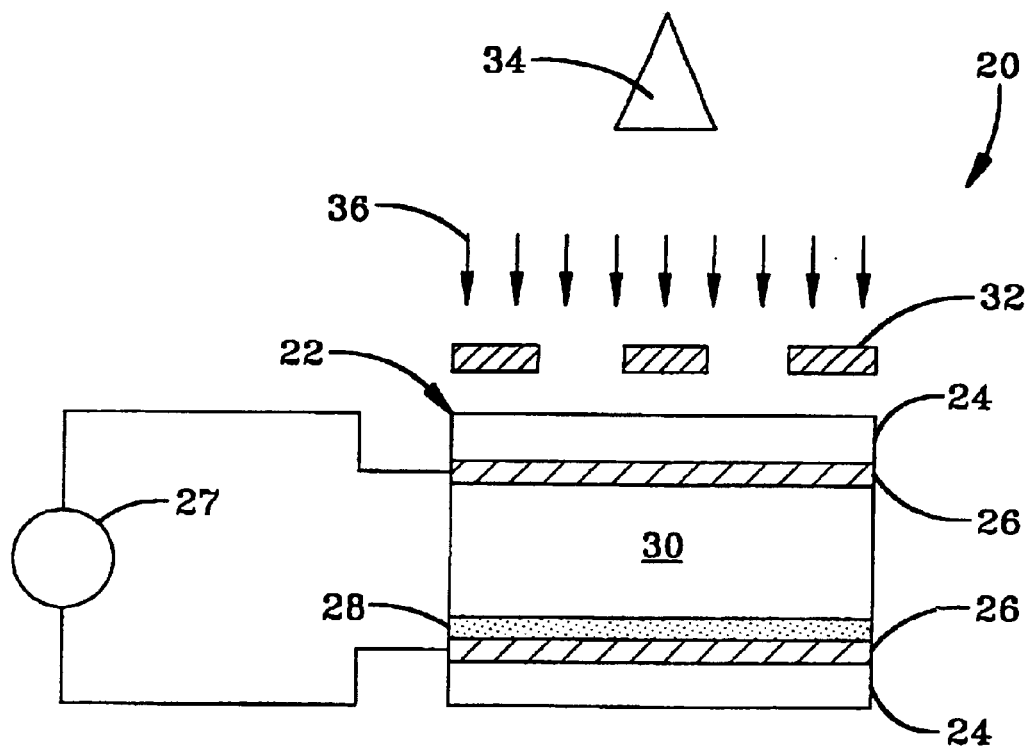
FIG. 1A is a schematic diagram showing preparation of a bounded microstructure using a collimated light source with a photomask.

Referring now to the drawings and, in particular, to FIG. 1A, it can be seen that an apparatus and related method for manufacturing an electrically controllable liquid crystal microstructure is designated generally by the numeral 20. Such a microstructure is carried or supported by a cell, generally indicated by the numeral 22. The cell 22 includes a pair of opposed substrates 24 which may either be glass, plastic, or any other substrate material, hard or flexible, commonly used in the manufacture of liquid crystal display cells. Each substrate 24 includes an electrode 26 that is connected to a power source 27. At least one of the substrates 24 is provided with an alignment layer 28 disposed over the electrode 26. In the preferred embodiment, the alignment layer 28 is a rubbed film of poly-vinyl-alcohol (PVA). Of course, other types of alignment layers and materials may be used as is documented in the art. Substrates are typically spaced with the use of glass fibers or bead spacers (not shown) of 5 $\mu$m in diameter for nematic liquid crystal cells and 3 $\mu$m in diameter for ferroelectric liquid crystal cells. Other appropriate sizes may be used.

A liquid crystal/prepolymer solution or mixture, generally designated by the numeral 30, is disposed between the substrates by capillary action at a temperature corresponding to the liquid crystal material's isotropic phase. For the samples discussed hereinbelow, nematic E-48 provided by Merck Chemical Company and ferroelectric Felix-15-100 provided by the Hoechst Company were used in conjunction with photocurable pre-polymer NOA-65 provided by the Norland Company. The mixture 30 may be provided in a weight ratio of 40:60 for ferroelectric liquid crystal material and 60:40 for nematic liquid crystal material. As discussed in U.S. Pat. No. 5,949,508, the concentrations of the liquid crystal material to the prepolymer may be varied anywhere from 10 to 90%, depending upon the desired end structure. Once the substrates are filled with the mixture 30, it is held by an a appropriate supporting fixture whereupon a photomask 32 may be applied over the outer surface of one of the substrates 24. The mask 32 may be applied directly to the substrate or positioned in a parallel arrangement at a predetermined distance from the substrate. A light source 34 is positioned above the substrate 24 with the photomask 32 therebetween. The light source may be an ultraviolet light, a laser light, or any other type of radiation source which causes the prepolymer within the mixture 30 to polymerize. If a visible light source is used to induce polymerization, a dye is mixed with the solution to shift photosensitivity from UV to visible radiation.

In the simplest case, without a photomask, the cell 20, after being filled with the mixture 30, is exposed to a normally incident beam of ultraviolet light. The gradient in the ultraviolet intensity causes anisotropic phase separation along the z direction perpendicular to the substrate surface resulting in two adjacent layers parallel to the substrates. In other words, a layer of polymeric material is formed adjacent the substrate closest to the UV light source 34 while a layer of liquid crystal material is formed on the substrate having the alignment layer 28. The thickness of the polymer and liquid crystal films depend directly on the size of the spacers used and the relative amounts of the two components within the mixture 30. The liquid crystal layer is aligned in the direction dictated by the alignment layer 28 on the adjacent substrate 24. The ease with which complete phase separation occurs and forms the phase separated composite organic films structures also depends on the chemical nature of the alignment layer. If the alignment layer is such that the liquid crystal material readily wets it, then the cell 22 can be formed with a relatively fast rate of polymerization. The mechanism responsible for complete phase separation, for this reason, is referred to as the polymerization and surface induced anisotropic phase separation. In the resultant cell, the polymer film has very little liquid crystal material trapped in it and the liquid crystal is nearly polymer-free. The liquid crystal-polymer interface occasionally penetrates the liquid crystal volume and binds to the opposing substrate. This provides mechanical strength to the cell, making it difficult for mechanical deformations to affect the cell's performance.

Figure 1B:
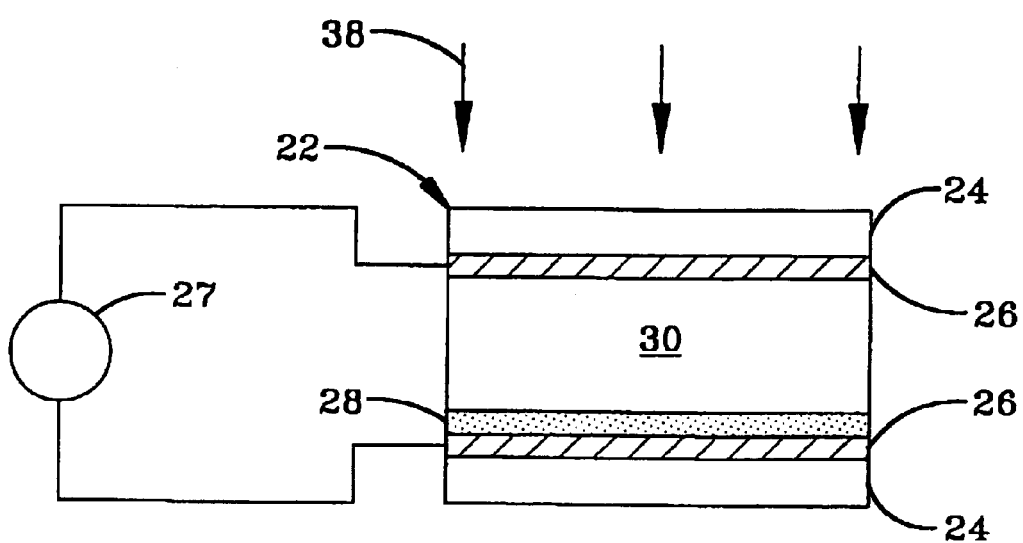
FIG. 1B is a schematic diagram showing preparation of a bounded microstructure using interference pattern of visible or UV laser beams without a photomask.

An alternative method of forming the cell 22 is shown in FIG. 1B. Instead of using an ultraviolet light source and a photomask, a collimated beam or an interference pattern of laser beams, designated by the numeral 38, may be used. Polymerization occurs in areas where the beam impinges upon the mixture 30. This results in formation of the microstructures where the beam does not impinge.

Use of interference of LW or visible light from conventional sources or lenses can be used to produce a spatially varying pattern that produces an intensity gradient in the cell. This creates microstructures much smaller than possible with masks. This method may also allow for precise shaping of the microstructure.

Figure 2:
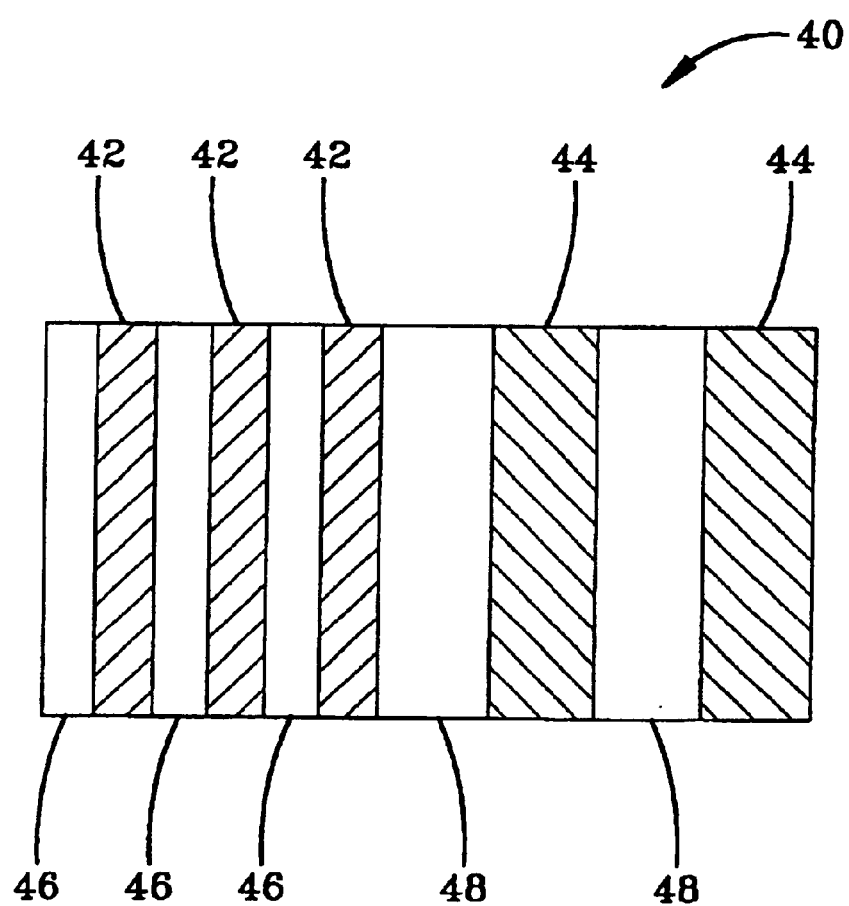
FIG. 2 is an enlarged top view of a photomask having two different line widths and pitch used in the formation of a one-dimensional grating.

The photomask 32 may be used to generate microstructures, such as a periodic linear grating to produce spatially periodic rate of polymerization and thus spatially periodic chemical potential in the direction perpendicular to the grating lines. For example, as seen in FIG. 2, a photomask, generally designated by the numeral 40, may have same pitch or may include a series of narrow pitch portions 42 and wide pitch portions 44. The mask 32 forms corresponding narrow areas of narrow exposure 46 and areas of wide exposure 48. Upon UV exposure, diffusion of liquid crystal material from the regions of high to low chemical potential occurs. If the rate of polymerization is reduced by lowering ultraviolet intensity and made comparable to or slower than the rate of diffusion of liquid crystal molecules, then the majority of liquid crystal material is expelled from the exposed areas 46 and 48, and then moves under the unexposed areas 42 and 44, leaving behind regions of nearly pure polymer. As a result of the separation along the horizontal and vertical directions, the concentration of liquid crystal material in the unexposed area is increased. The microstructures thus obtained are switchable linear gratings consisting of alternating regions of nearly pure polymer and regions of vertically phase separated liquid crystal and polymer regions. Depending on the pitch and the width of the masked areas, in some cases, a subsequent ultraviolet exposure without the photomask may be carried out to cause phase separation primarily along the z-direction in previously unexposed areas.

Depending on the size of the exposed and protected areas, it is possible to produce electrically controllable optical gratings such as periodic layers of PSCOF/PDLC, PSCOF/polymer, and PSCOF/PSCOF. An example of an enlarged PSCOF/PDLC grating using nematic liquid crystal material in a sample of 50 $\mu$m thickness is shown in FIG. 3. The PSCOF structure is designated by the capital letter A in FIG. 3 to show the unexposed region, wherein the PSCOF structure provides a liquid crystal portion adjacent the substrate with the alignment layer and a polymer portion adjacent the other substrate. The grating sizes are about 180 $\mu$m on the right side of the Fig. and 90 $\mu$m in the left portion of the FIG. The capital letter B designation shows the substantially pure polymer area.

FIG. 4 shows an example of a grating with alternating lines of PSCOF and pure polymer prepared using ferroelectric liquid crystal material in a sample of 3 $\mu$m thickness. The grating sizes are 90 $\mu$m and 180 arm in lower left and upper right regions respectively. The PSCOF region is designated by the capital letter A, and is formed in the ultraviolet protected region. The photomask shown in FIG. 2 may be employed to generate the cells with such patterns.

Figure 5A:
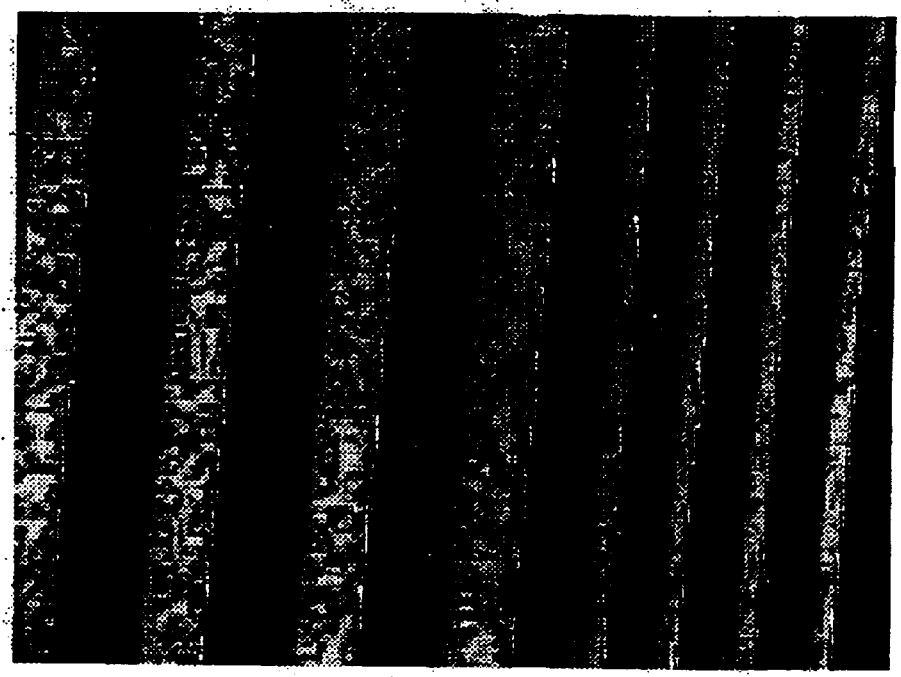
FIG. 5A is a microphotograph of a one-dimensional nematic liquid crystal grating with a pitch of 200/100 $\mu$m in a 5 $\mu$m thick cell using a polymer dispersed liquid crystal methodology. The LC lines have internal structures responsible for light scattering.
Figure 5B:
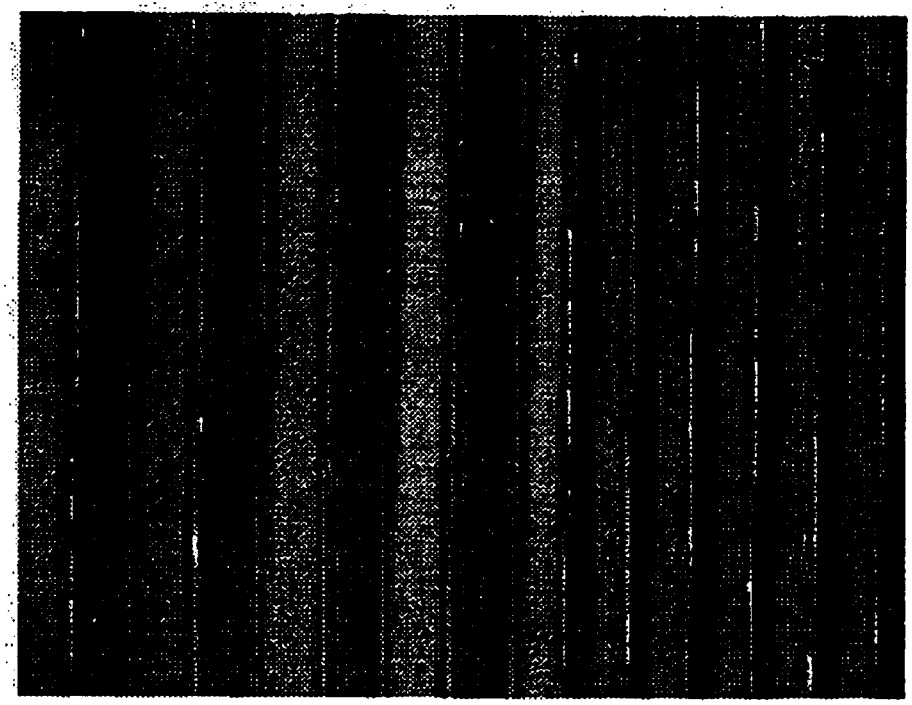
FIG. 5B is a microphotograph of a one-dimensional nematic liquid crystal grating with a pitch of 200/100 $\mu$m in a 5 $\mu$m thick cell using the phase separated composite organic film methodology, wherein the grating has no internal structure and is free from light scattering.
Figure 5C:
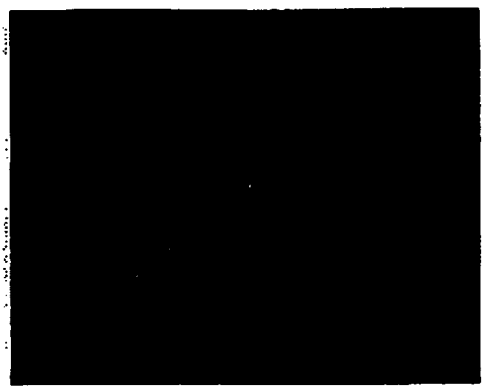
FIG. 5C is a photograph of a diffracted beam image produced by a one-dimensional grating at 0 applied volts.
Figure 5D:
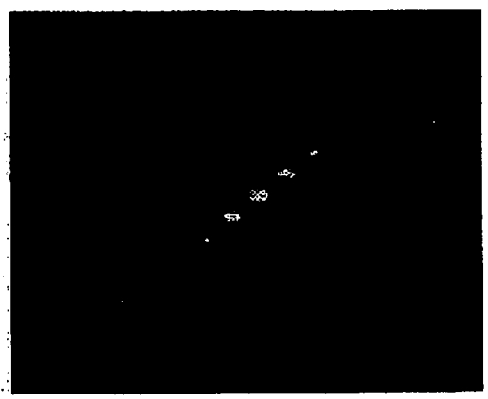
FIG. 5D shows the effect of application of 3 volts to the grating.
Figure 5E:
FIG. 5E shows vanishing diffraction at the application of 10 volts to the grating.

Still yet another example of such a periodic linear grating is shown in FIGS. 5A and 5B. The one-dimensional nematic liquid crystal gratings shown have a pitch of 200/1001 m in a 5 $\mu$m thick cell. To compare their internal structures, FIG. 5A shows a linear array of lines of polymer adjacent to lines of polymer dispersed liquid crystal (PDLC) and FIG. 5B shows lines of polymer and PSCOF structure prepared with the PSCOF method. Structure internal to the PDLC lines is clearly visible. During phase separation, the liquid crystal material orients in the direction dictated by the alignment layer on one of the substrates and then imprints compatible anchoring conditions on the liquid crystal-polymer interface. Consequently, the liquid crystal director is oriented homogeneously. With use of the electrodes 26, application of an electric field to change the director orientation and thus the optical path length offered by the lines of liquid crystal material is provided. Thus, a switchable grating may be constructed. One of the major advantages of preparing such a structure with the PSCOF method over those prepared with a PDLC method is that a linear structure is obtained which is optically very clear as there are no microdroplets of liquid crystal material which normally give rise to high scattering of light and thus reduced efficiency. This difference provides higher transmission and efficiency of gratings prepared with the disclosed method. A microscopic view of a one-dimensional grating of 25 $\mu$m pitch along with the optical diffraction pattern obtained with a He-Ne laser beam is shown in FIGS. 5C–E. In particular, FIG. 5C shows a diffracted beam image with no voltage applied, FIG. 5D shows an image with 3 volts and FIG. 5E shows a grating with 10 volts applied. Clearly, the extent of diffraction is electrically controllable by selectively addressing grating lines in a specific pattern (sequence), such as every other line, one can increase the effective pitch of these gratings. As can be seen, the PSCOF grating has no internal structure and is free from scattering of light.

Figure 6:
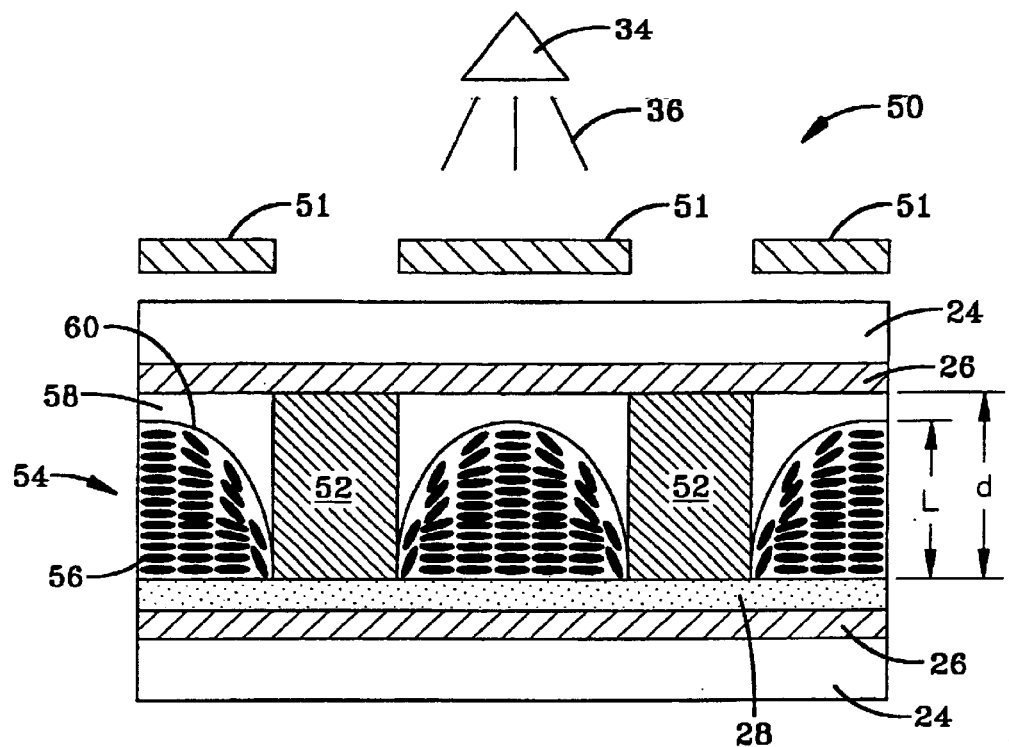
FIG. 6 is a schematic diagram of a bounded microstructure prepared with a two-dimensional photomask positioned adjacent one of the substrates. The plano-convex shape of the LC regions is responsible for their ability to focus a beam of light.

Referring now to FIG. 6, it can be seen that a cell designated generally by the numeral 50, forms a bounded microstructure of the present invention. In addition to the features already described in FIGS. 1A and 1B, use of a mask 51 results in the formation of the ran microstructure that includes polymer walls 52 extending between both inner surfaces of the substrates 26, wherein the polymer wall 52 contacts the alignment layer 28 where provided. In regions where the polymer walls 52 are not formed, a liquid crystal region, designated generally by the numeral 54, is formed. The liquid crystal region 54 includes a portion of liquid crystal material 56 adjacent the alignment layer 28 and a portion of polymer material 58 adjacent the other substrate 24. An interface 60 is formed between the liquid crystal material 56 and the polymer material 58. The interface 60 may be parabolic or any other uniform curvilinear type of shape. The shape of the interface is believed critical to the operation of the microstructure. How the interface 60 is formed is dictated by at least the materials used for the mixture 30, the alignment layer 28, the rate of diffusion of LC and polymer molecules, the spacing of the substrates, the photomask, if used, the rate of polymerization, and how polymerization is initiated.

Figure 7:
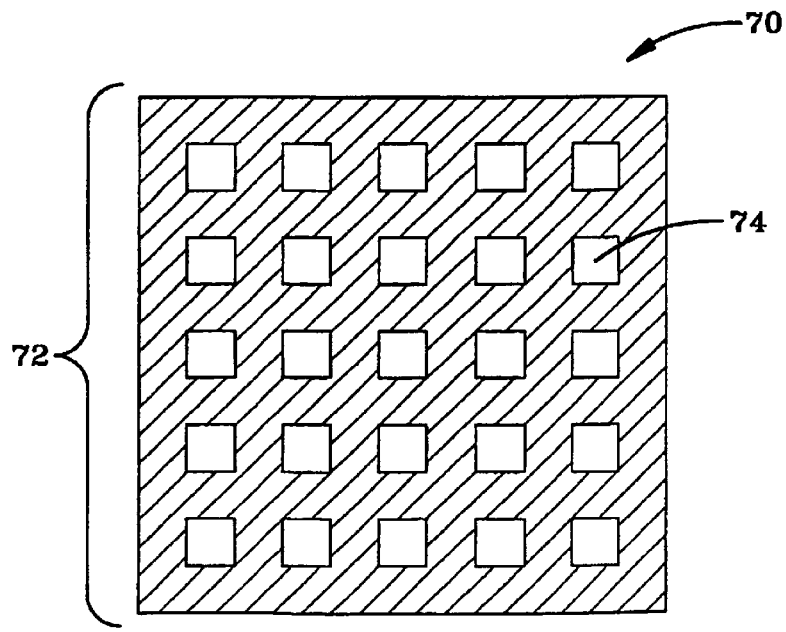
FIG. 7 is an enlarged top view of a photomask used in the formation of a two-dimensional microstructure.
Figure 8:
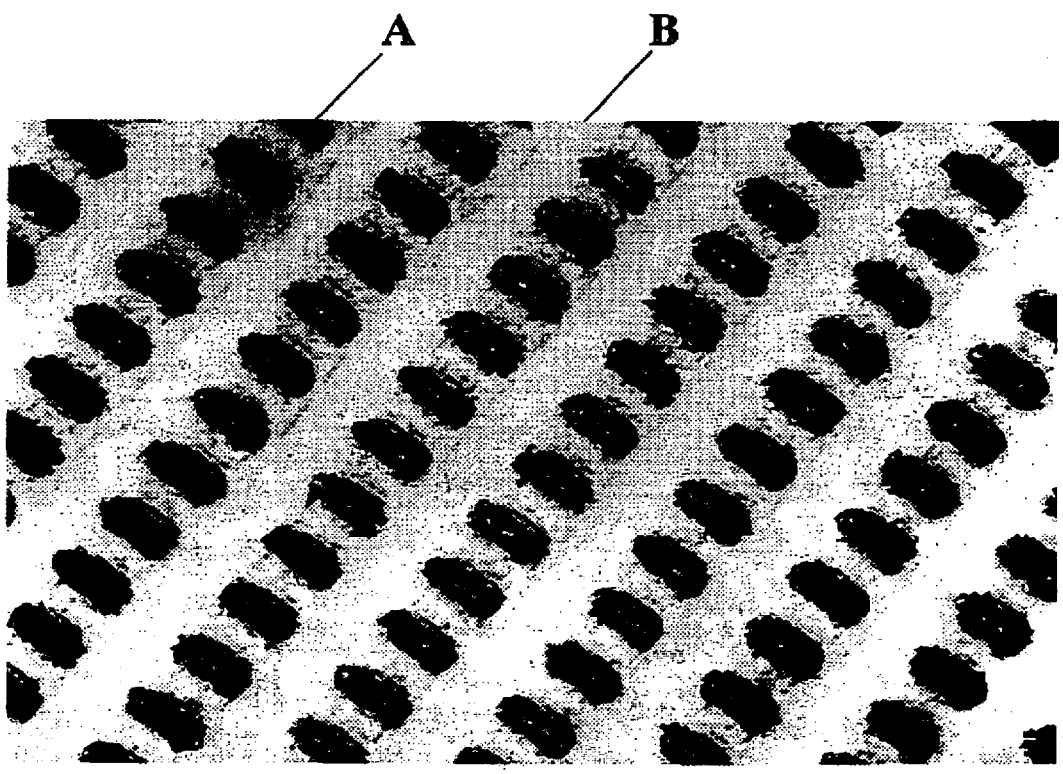
FIG. 8 is a microphotograph of a two-dimensional microstructure using ferroelectric liquid crystal under a polarizing microscope. Dark areas (A) are non-birefringent pure polymer regions and bright areas (B) are birefringent due to LC in them.

Referring now to FIG. 7, it can be seen that a two-dimensional photomask, designated generally by the numeral 70, may be employed to form the cell 50. The two-dimensional mask 70 includes an array 72 which provides a plurality of square openings 74. As seen in FIG. 8, a cell using ferroelectric liquid crystal material, and prepared using a mask with rectangular openings (not shown) having a thickness of 3 $\mu$m is shown. In this case, the direction of the largest intensity gradient is perpendicular to the boundaries of the exposed rectangular openings along horizontal directions. During the exposure through the mask, the ferroelectric liquid crystal material migrates outwards and moves under the shadow of the mask. As a result, the exposed areas are nearly 100% polymer. The liquid crystal and polymer form separated regions along the direction of illumination, in the unexposed areas. The liquid crystal material is aligned homogeneously by the alignment layer on the adjacent substrate and the optic axis can be reoriented with the help of an applied field provided by the electrodes 26. As such, this forms a device that acts as a switchable two-dimensional grating.

Figure 9A:
FIG. 9A shows the effect of application of 10 volts.
Figure 9B:
FIG. 9B shows the effect of application of 0 volts.
Figure 9C:
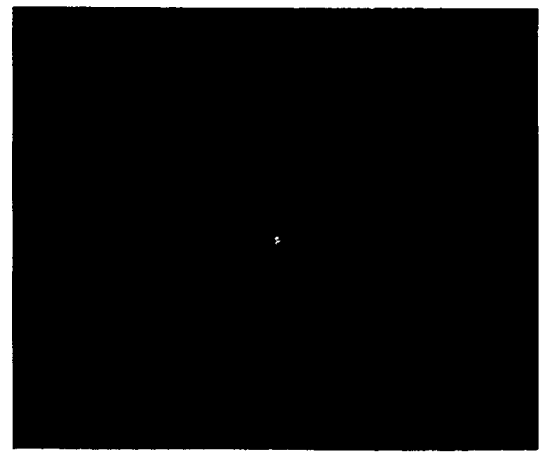
FIG. 9C shows the effect of application of a −10 volts.

FIG. 8 shows the alignment texture of a microdomain array using ferroelectric liquid crystal material under a polarizing microscope. The PSCOF structure, designated by the letter B, is formed in the ultraviolet protected region and consists of separated LC and polymer regions. The dark (non-birefringent) areas have pure polymer regions. Accordingly, it is possible to form any arbitrary shape with a corresponding photomask. FIG. 9A, B, and C show the diffractive beam images obtained as a function of an applied field to the two-dimensional grating shown in FIG. 8. FIG. 9A shows a pronounced two-dimensional diffraction pattern upon application of 0 volts to the two-dimensional grating, FIG. 9B shows diminished intensities on application of 0 volt to the cell, and FIG. 9C shows nearly a complete absence of diffraction at −10 volts. These two-dimensional gratings should offer a tremendous advantage in high-density interconnects with fast switching on the order of microseconds. Sum total of intensities of the first eight diffraction maxima [($\pm 1,0$)($0, \pm 1$), and ($\pm 1, \pm 1$)] is measured to be about 26% of the zeroth order maximum. It should be possible to increase this diffraction efficiency to nearly 100% with proper control and optimization of the structure formation process.

These two-dimensional gratings can be driven using a passive or an active matrix addressing schemes depending on the desired applications and the liquid crystal material used. Primary applications for such gratings would be in optical projection systems, high-speed beam steering, and high-density interconnects. The switching behavior of a ferroelectric liquid crystal material in bounded regions which form these structures can be bistable, making them a prime candidate for use in high-density optical storage devices.

Figure 10:
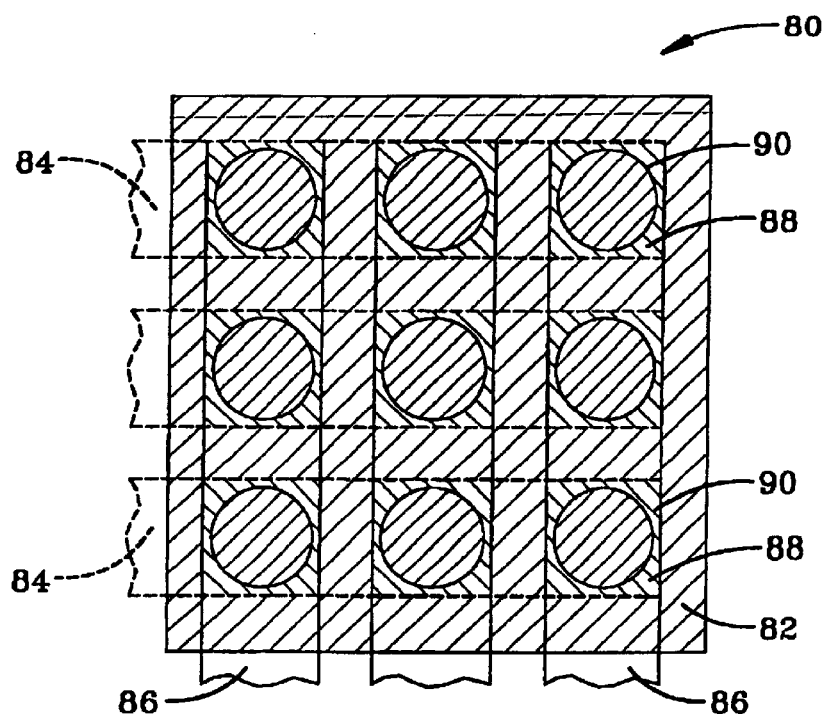
FIG. 10 is a schematic diagram (top view) of a cell with an array of microlenses with electrodes to control them.
Figure 11:
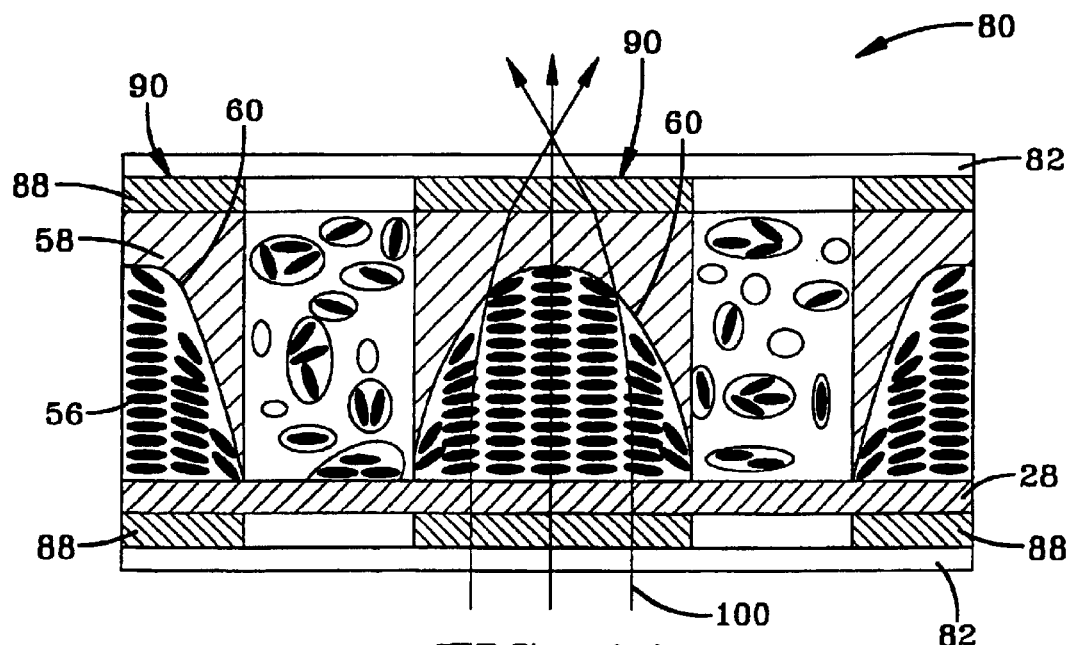
FIG. 11 is a schematic diagram of a microlens made in accordance with the concepts of the present invention and focusing of parallel rays incident from below.

Referring now to FIG. 10, an example of a microlens array is designated generally by the numeral 80. The array 80 includes a pair of substrates 82, wherein lower electrode connections 84 are shown as dashed stripes and upper substrate electrode connections 86 are shown as the solid electrodes on both substrates are transparent. The heavily shaded regions designate a microlens electrode pad 88 which may be a thin film transistor for active matrix addressing and wherein the exposed regions form a three-dimensional microlens 90. In other words, each substrate has an electrode pad spaced apart from a corresponding electrode pad on the other substrate. Each microlens 90 is formed between intersecting electrode pads 88. As such, a switchable microlens between two substrates allows for selective switching of lenses in an array. The microlens array 80 can be switched with active or passive matrix operating methods. A switchable microlens makes use of the electrically controllable spatial distribution of a liquid crystal's refractive index inside a microscopic, but well-defined and positioned volume elements 90 bounded by substrates and polymer-rich areas produced with the bounded phase separated composite organic film methodology. Such a structure is schematically presented in FIG. 11. As shown, a cell 80 provides a microlens with a curved interface 60 which allows for direction of incident light designated generally by the numeral 100, in a manner dictated by application of voltage across the electrodes. A change in the applied voltage changes the optic axis configuration of the LC material which, along with the interface, changes the behavior of light passing through the cell. Such a structure provides a new generation of microlenses having the capabilities of switching between focusing and non-focusing states on demand with superior mechanical stability. Such microlenses remain transparent in focusing and non-focusing states. Their focal length is controllable by proper shaping of the curved interface 60 and by changing the electric field applied across the electrode pads 88.

In the preferred embodiment, use of ultraviolet exposure through a mask with circular regions about 500 $\mu$m in diameter forms circular regions of liquid crystal material. The ultraviolet light exposure causes liquid crystal to migrate from the exposed areas to the unexposed areas creating a concentration gradient under and near the shaded regions. Because of the concentration gradient and diffusion limited migration of liquid crystal and prepolymer molecules, the curved interface between the liquid crystal and polymers is obtained. Wetting properties of the liquid crystal material with the alignment layer used plays a crucial role in determining the processing parameters and the shape of the interface. The liquid crystal director in these bounded liquid crystal regions is aligned in compliance with the alignment layer. Because of the shape of the interface and the alignment of the liquid crystal optic axis, a refractive index gradient or GRI, is created from the outer edge of the circular lens area towards their respective center. This GRI profile is apparent under cross polarizers in the variation of color from the center to the edge of the lens area.

Figure 12A:
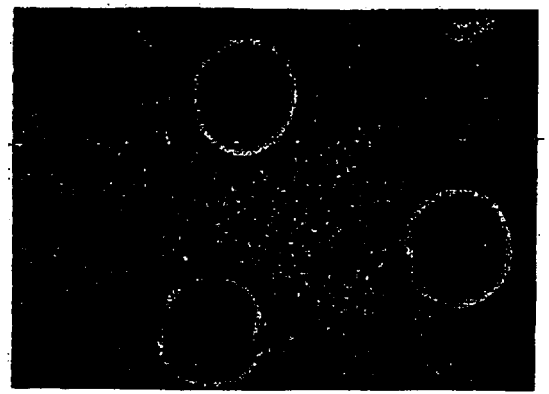
FIG. 12 is a series of microphotographs of a microscopic texture of a cell with microlenses under a polarizing microscope, the rubbing direction/liquid crystal alignment in FIG. 12A is at 45° and in FIG. 12B is at 0°, with respect to one of the crossed polarizers.
FIG. 12C shows application of a 0.5 volt/$\mu$m applied to the microlenses
FIG. 12D shows application of a 1 volt/$\mu$m applied to the microlenses.
Figure 12B:
Figure 12C:
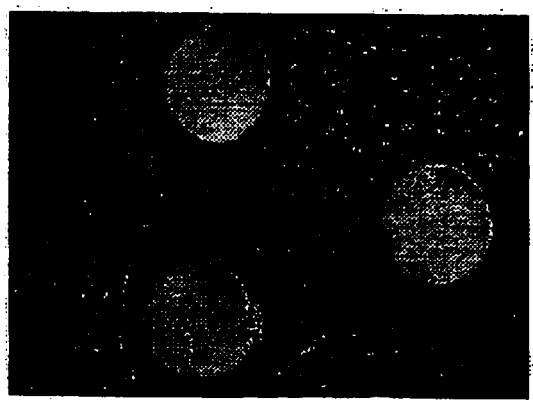
Figure 12D:
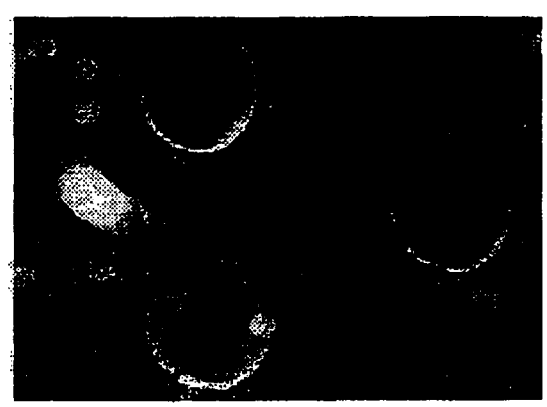

FIGS. 12A–D present different states or appearances of the microlenses prepared according to the present disclosure under a polarizing microscope. In FIG. 12A, the rubbing direction of the alignment layer is at 45° with respect to one of the crossed polarizers. FIG. 12B is the same as FIG. 12A except that the rubbing direction is at 0° with respect to one; of the crossed polarizers. Outside the circular area of each microlens is a polymer dispersed liquid crystal structure. This region primarily contains polymeric material with a small percentage of liquid crystal material. It is possible to render this region entirely free of LC by controlling processing parameters and/or using the double exposure method discussed earlier. FIGS. 12C and 12D show the appearance of the same microlenses as in FIGS. 12A and B, wherein an electric field of 0.5 v/μm is applied to the microlenses in FIGS. 12C and 1.0 v/μm is applied to the microlenses in FIG. 12D.

Figure 13A:
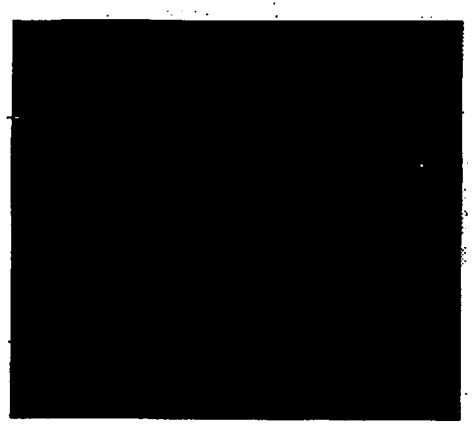
FIG. 13A shows light passing through at a distance of 4 cm.
Figure 13B:
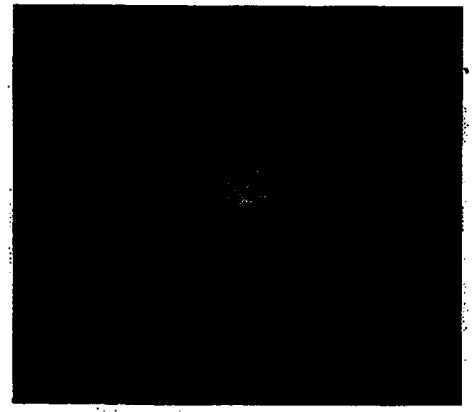
FIG. 13B shows light passing through and focuses at a distance of 5 cm.
Figure 13C:
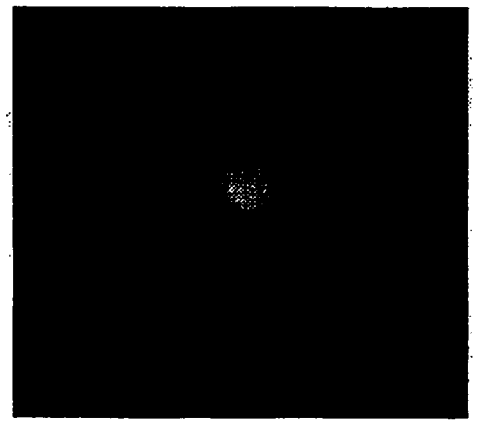
FIG. 13C shows light passing through at a distance of 10 cm.
Figure 14:
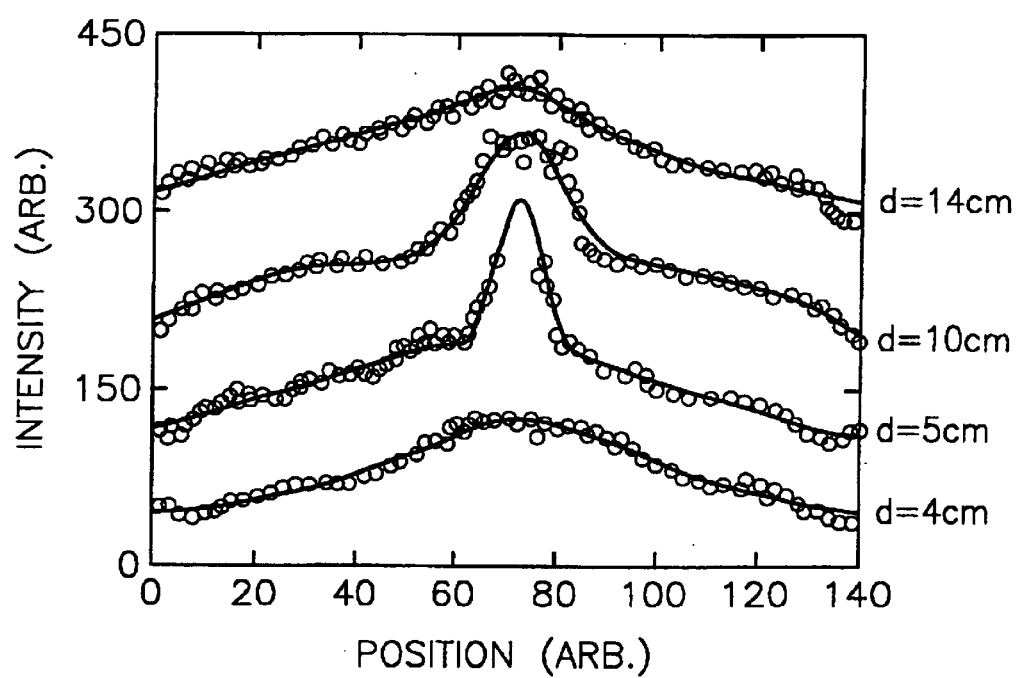
FIG. 14 is a graphical representation of the various measured intensity profiles at different distances for the microlenses shown in FIG. 13.

FIGS. 13A–C show an intensity profile of a helium-neon laser beam, obtained with a CCD camera, after the beam passes through one of the microlenses shown in FIG. 12 at different distances. FIG. 13A shows the appearance of the cell at a distance of 4 cm. FIG. 13B shows that the beam is sharply focused at a distance of 5 cm from the microlens and FIG. 13C shows the beam is defocused at a distance at 10 cm. These results show that the focal length of the microlens is about 5 cm. A graphical representation of the intensity profiles at different distances is shown in FIG. 14.

Figure 15A:
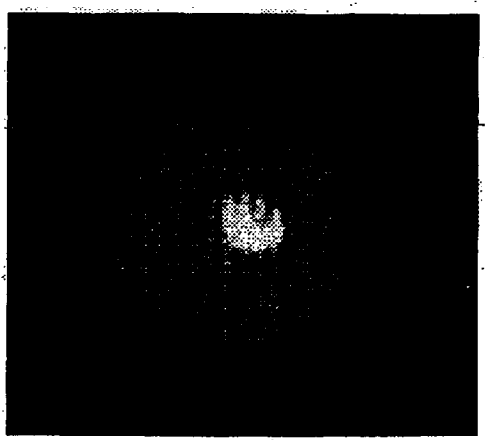
FIG. 15A shows application of 0 volts.
Figure 15B:
FIG. 15B shows application of 3 volts.
Figure 15C:
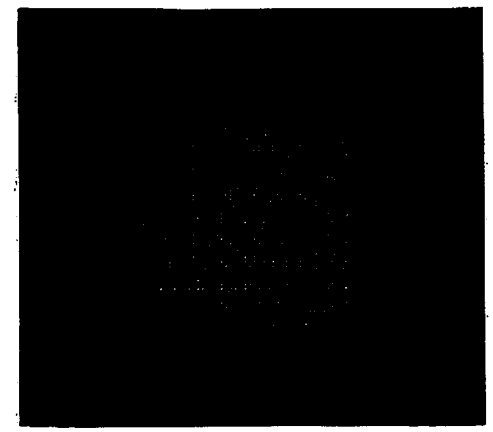
FIG. 15C shows application of 5 volts.
Figure 16:
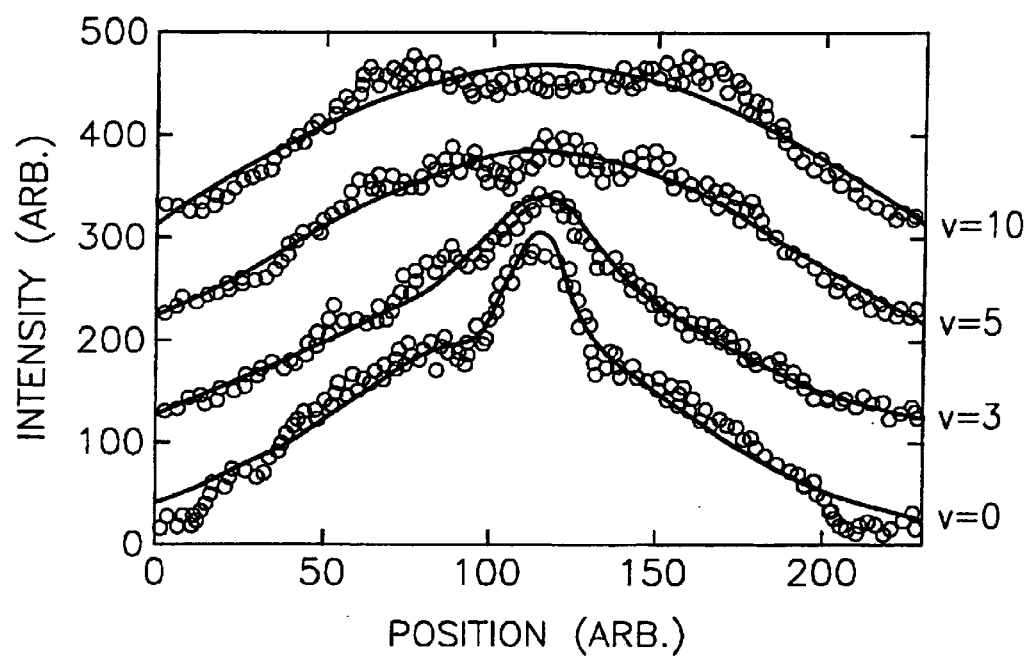
FIG. 16 is a graphical representation of the measured intensity profiles of last beam passing through one of the microlenses shown in FIG. 2.

It can also be seen that application of voltage to the microlens changes the appearance of the transmitted beam as the focal length is changed. FIGS. 15A–C show a detector at a distance of 5 cm from the microlens illustrates the defocusing and focusing attributes of the beam as the voltage is increased. FIG. 15A shows bean focusing by the lens with 0 voltage applied, FIG. 15B shows the appearance of the light beam beginning to defocus with 3 volts applied and FIG. 15C shows a complete defocusing of the beam with 5 volts applied. Accordingly, the focal length gradually moves from 5 cm to infinity with increasing voltage. FIG. 16 shows a graphical representation of the intensity versus different applied voltages. Proper shaping of the curvilinear interface may be obtained by first using a mask to form the polymer region walls and then removal of the mask and re-application of a polymerizing UV light. The rate of polymerization determined by the intensity of UV beam controls the shape of the curved interface and, hence, the focal length. Very different focal lengths ranging from 1.8 mm to 10 cm have already been achieved using the present invention.

The method for polymerizing the mixture captured between the substrates is critical in determining the shape and size of the bounded microstructure. It is believed that lenses can be manufactured with diameters as small as 50,000 angstroms (5 nm) with an appropriate photomask. Use of an ultraviolet laser light interference pattern in place of mask can provide a lens of size of about 3,000 angstroms while use of a visible laser beam interference pattern could conceivably provide a lens sized to about 5,000 angstroms. It is submitted that none of the previous art provides liquid crystal bounded microstructures of such size having variable focal lengths or properties that can be electrically controlled.

Such three-dimensional microlenses remain transparent at all voltages and in focusing as well as in non-focusing states. If desired, a combination of polarizers and analyzers placed before and after the microlenses or any of the microstructure presented herein could be used to render the combination non-transparent in the non-focusing state. This provides a unique advantage of controlling the focusing action as well as the level of optical transmission within the applied field, uniquely combining focusing and shuttering attributes in one device. Previously, this was only accomplished with the use of two devices produced with different technologies. Since the GRI profile can be controlled by changing the cell thickness, the relative diffusion rate of the liquid crystal and the polymer, and the rate of polymerization, it is possible to fabricate microlenses of different focal lengths. The density of such lenses and their placement can be controlled with the use of an appropriate photomask as discussed above. The ability to selectively address with a well-known matrix addressing schemes commonly used in liquid crystal displays makes the foregoing devices quite versatile.

Figure 17A:
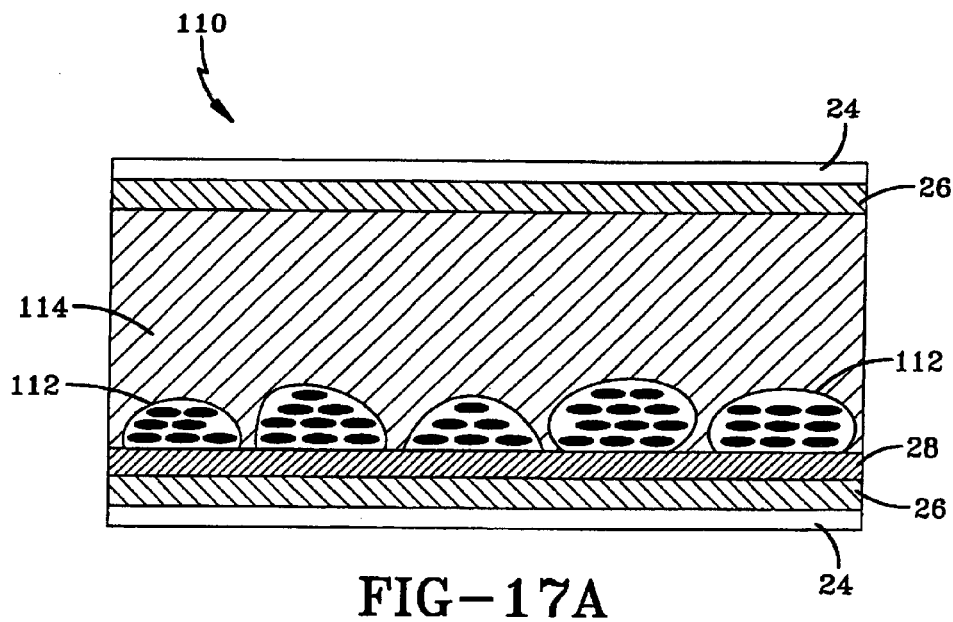
FIGS. 17A–B are schematic diagrams of bounded phase separated composite organic film microstructure cells made in accordance with the concepts of the present invention.
Figure 17B:
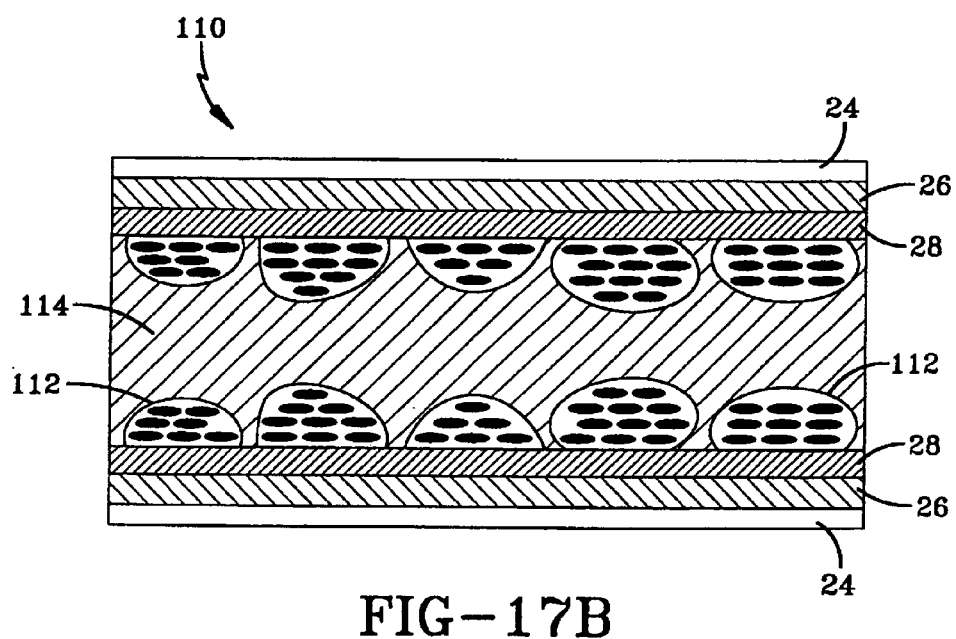

Referring now to FIGS. 17A–B, it can be seen that a cell, generally indicated by the numeral 110, is a bounded phase separated composite organic structure. Similar to the cells shown in FIGS. 1A–B, the cell 110 includes opposed substrates 24 with electrodes 26 on each. At least one of the substrates has an alignment layer 28. The phase separation process is performed so as to form randomly positioned, yet bounded, liquid crystal microstructures 112. Each microstructure is adjacent the substrate with the alignment layer 28. It is believed that with proper control of the phase separation process and an alignment layer on the other substrate, the microstructures 112 could be adjacent both substrates as seen in FIG. 17B. A substantially polymer region 114 bonds the substrates to one another and essentially forms a polymer film or layer between the two substrates. In this embodiment, the microstructure 114 is bounded by polymer, but not formed with a specific curvilinear interface. If the rate of phase separation is relatively fast, but slower than the rate which produces PDLC structures, the liquid crystal migrates toward the substrate with the alignment layer. However, because of the speed of phase separation, LC remains confined to regions bounded by the substrate and the polymer. LC in these droplets is aligned by the alignment layer. Application of an electric field reorients their optic axis and such devices can be used for display applications. It has been found that if a smectic (ferroelectric, antiferroelectric, etc.) LC is used, the cells switch bistably and possess grey scale.

Figure 18:
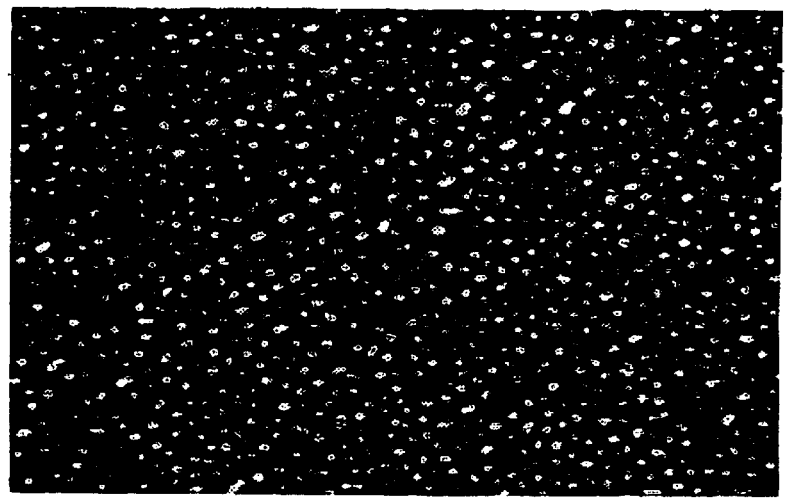
FIG. 18 is a microphotograph of a bounded microstructure cell.
Figure 19A:
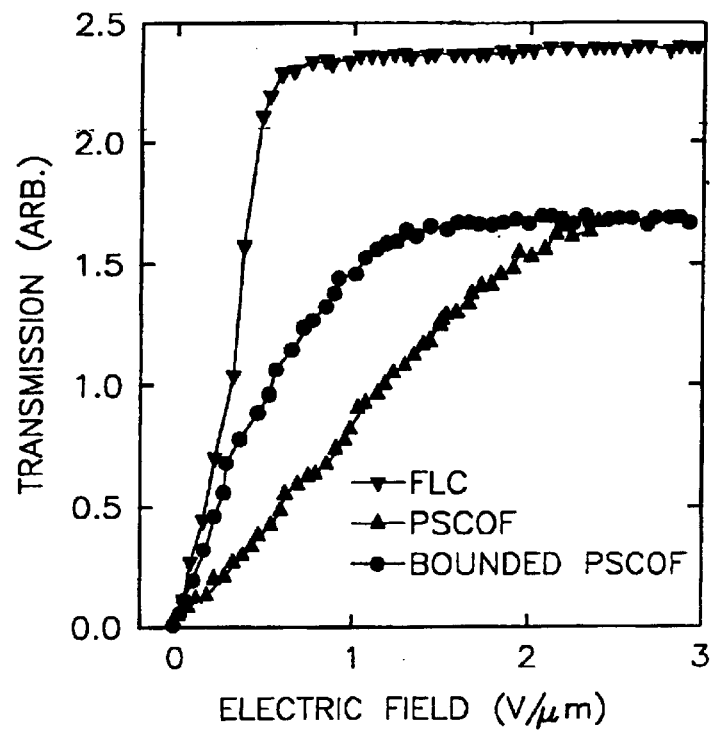
FIGS. 19A and 19B are graphical representations of optical transmission and response time of pure ferroelectric liquid crystal material, phase separated composite organic films and bounded phase separated composite organic films.
Figure 19B:
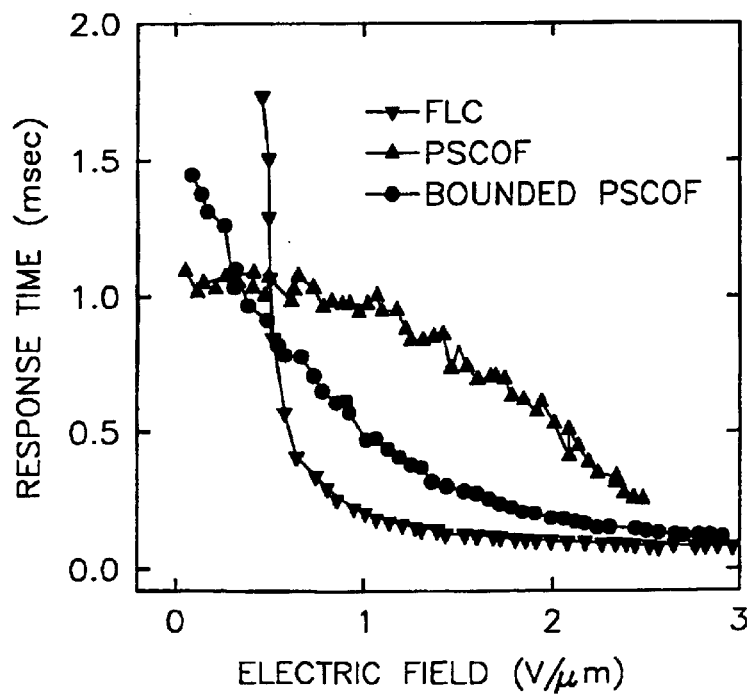

An example of such a cell is shown in FIG. 18 and its transmission and response time properties are shown in FIGS. 19A–B. The cell 110 exhibits electrical bistability with superior mechanical stability properties. In other words, the microstructures 112 can be switched to stable states upon application of an electric or magnetic field or the like; and will remain in that stable state upon removal of the field. Such a cell is mechanically stable by virtue of the polymer region 114.

Free standing composite structures can also be formed by spreading the pre-polymer and LC solution like a soap bubble over an aperture and then initiating phase separation using UV illumination from both sites. This should permit fabrication of PSCOS structures without substrates. These free standing structures can be put on other surfaces adjacent an electrooptical device.

The use and advantages of such devices described above are readily apparent. They allow for fabrication of high-efficiency and transmission of an electrically controlled one and two-dimensional gratings, microlens arrays and bounded microstructures using a simple and low cost method. By using the methodology described above, these devices possess the capability of withstanding high mechanical stress and, moreover, can be prepared with flexible, thin, and low-weight substrates or as a self-supporting film without substrates. It is believed that these devices will be valuable in focused beam steering, active-fiber star couplers for high-density optical communications, optical computing, parallel interconnects for neural networks, and optical limiters as well as other military and highly specialized applications.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of true scope and breadth of the invention, reference should be made to the following claims.

What is claimed is:

1. A light modulating cell, comprising:
   first and second opposed substrates;
   a solution of prepolymer and low molecular weight (LMW) organic material, wherein said solution is disposed between the substrates and is phase separated to form:
      a layer of polymeric material primarily adjacent to the first substrate; and
      a defined microstructure of LMW organic material primarily adjacent to the second substrate, the microstructure being bounded by portions of the polymeric material extending to the second substrate, the defined microstructure defining a diffraction grating.

2. The cell according to claim 1, further comprising:
   an alignment layer disposed on the second substrate to affect said defined microstructure.

3. The cell according to claim 3 claim 1, further comprising:
   an electrode layer disposed on each said substrate facing both said layers for applying an electric field to alter the optical appearance of the cell.

4. The cell according to claim 3, wherein said defined microstructure defines a one-dimensional linear grating.

5. The cell according to claim 4, wherein said one-dimensional linear grating is electrically switchable via the electrode layers.

6. The cell according to claim 5, wherein said one-dimensional linear grating includes a plurality of varying-width gratings.

7. The cell according to claim 3, wherein said defined microstructure defines a two-dimensional grating.

8. The cell according to claim 7, wherein said two-dimensional grating is electrically switchable via the electrode layers.

9. A light modulating cell comprising:
   first and second opposed substrates;
   a solution of prepolymer and low molecular weight (LMW) organic material, wherein said solution is disposed between the substrates and is phase separated to form:
      a layer of polymeric material primarily adjacent to the first substrate; and
      a defined microstructure of LMW organic material primarily adjacent to the second substrate, the microstructure being bounded by portions of the polymeric material extending to the second substrate, said defined microstructure defining an array of microlenses.

10. The cell according to claim 9, wherein each microlens in said array of microlenses includes a liquid crystal region having a curved interface between said liquid crystal region and said layer of polymeric material.

11. The cell according to claim 10, wherein each said microlens is electrically controllable, and wherein a change in the electric field applied to each said microlens changes the focal length thereof.

12. The cell according to claim 10, wherein the curved interface is substantially parabolic.

13. The cell according to claim 9, wherein the microlenses have a lateral dimension of less than about five microns.

14. The cell according to claim 9, wherein the microlenses have a lateral dimension of less than about 0.5 microns.

15. A method for fabricating a low molecular weight microstructure, comprising the steps of:
   preparing a solution of prepolymer and low molecular weight (LMW) organic material;
   disposing said solution between pairs of substrates; and
   inducing phase separation of said solution, the inducing being spatially controlled both transverse to and along the substrates to form at least one LMW microstructure on one of said substrates.

16. The method according to claim 15, wherein said step of inducing is by heating said solution.

17. The method according to claim 15, wherein said step of inducing is by including a solvent in said solution.

18. The method according to claim 15, wherein said step of inducing is by positioning a light source above one of said substrates.

19. The method according to claim 18, further comprising the step of positioning a mask between said light source and said substrates, wherein openings in said mask direct light from said source between said substrates and polymerize said prepolymer and bound said LMW microstructure.

20. The method according to claim 19 further comprising the steps of:
   removing said mask;
   positioning a second mask between said light source and said substrate; and
   illuminating said light source to complete phase separation and further control configuration of said LMW microstructure.

21. The method according to claim 19, wherein said light source is ultraviolet.

22. The method according to claim 19, further comprising a step of mixing in said solution, a dye sensitive to visible light radiation, and wherein said light source generates visible light.

23. The method according to claim 18, further comprising:
   providing an electrode on each said substrate facing one another; and
   electrically controlling the LMW material in said LMW microstructure via the electrode.

24. The method according to claim 18 further comprising the step of:
   providing an interference pattern of said light source to generate a spatially varying pattern which generates a corresponding intensity gradient in the cell.

25. The method according to claim 15, further comprising the step of providing an alignment layer on one of said substrates such that said LMW microstructure forms on said substrate with said alignment layer.

26. A light modulating cell, comprising:

a solution of prepolymer and low molecular weight (LMW) organic material that is phase separated to form:

a layer of polymeric material; and a defined microstructure of LMW organic material disposed on one side of the layer of polymeric material, the defined microstructure defining one or more diffractive or refractive optical elements.

27. The cell as set forth in claim 26, wherein the one or more diffractive or refractive optical elements are selected from a group consisting of:

(i) one or more diffraction-gratings; and (ii) a plurality of microlenses.

28. The cell as set forth in claim 26, further comprising:

first and second opposed substrates separated by a gap containing the layer of polymeric material and the defined microstructure, the layer of polymeric material being primarily adjacent to the first substrate, the defined microstructure being primarily adjacent to the second substrate; and electrical circuitry for selectably electrically modulating the LMW organic material of the defined microstructure to electrically control a diffractive or refractive characteristic of the one or more diffractive or refractive optical elements.

29. The cell as set forth in claim 28, wherein the one or more diffractive or refractive optical elements include a plurality of diffractive or refractive optical elements, and the electrical circuitry includes:

one of an active electrical control matrix and a passive electrical control matrix for selectably controlling individual ones or sub-sets of the plurality of diffractive or refractive optical elements.

30. The cell as set forth in claim 26, wherein the solution of prepolymer and low molecular weight (LMW) organic material is suspended within an aperture during the phase separation.

\* \* \* \* \*